United States Patent
Barzegar et al.

(10) Patent No.: US 8,031,841 B2
(45) Date of Patent: Oct. 4, 2011

(54) METHOD AND APPARATUS FOR AUTOMATED ASYMMETRIC DIGITAL SUBSCRIBER LINE LOOP TESTING

(75) Inventors: Farhad Barzegar, Branchburg, NJ (US); Irwin Gerszberg, Kendall Park, NJ (US); Thomas Hill, Oviedo, FL (US); Scott Mollica, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 31 days.

(21) Appl. No.: 12/619,595

(22) Filed: Nov. 16, 2009

(65) Prior Publication Data

US 2010/0061525 A1  Mar. 11, 2010

Related U.S. Application Data

(63) Continuation of application No. 11/208,999, filed on Aug. 22, 2005, now Pat. No. 7,620,155.

(51) Int. Cl.
*H04M 1/24* (2006.01)
*H04M 3/08* (2006.01)
*H04M 3/22* (2006.01)

(52) U.S. Cl. ..... 379/1.04; 379/2; 379/22.01; 379/27.01; 379/27.06; 379/30

(58) Field of Classification Search ............ 379/1.01, 379/1.03, 1.04, 2, 8, 9, 9.06, 10.01, 12, 15.01, 379/22.01, 22.02, 22.04, 23, 24, 26.01, 27.01, 379/29.01

See application file for complete search history.

(56) References Cited

U.S. PATENT DOCUMENTS

| | | |
|---|---|---|
| 6,278,769 B1 | 8/2001 | Bella |
| 6,549,610 B2 | 4/2003 | Kikui |
| 6,618,469 B2 | 9/2003 | Wang et al. |
| 7,076,030 B2 | 7/2006 | Bella et al. |
| 7,620,155 B1 | 11/2009 | Barzegar et al. |
| 2003/0048756 A1 | 3/2003 | Chang et al. |
| 2005/0249332 A1 | 11/2005 | Chang et al. |

*Primary Examiner* — Binh Tieu

(57) ABSTRACT

A method and apparatus for mechanizing the currently manual ADSL loop testing process is disclosed. In one embodiment, an automated loop testing device is disclosed, where the loop testing device has a pair of terminals, e.g., RJ-11 jacks on both sides of the device. The jack on one side connects to inside wiring which, in turn, connects to an ADSL modem. The other jack connects to an outside line which, in turn, connects to a central office of a network provider. In operation, the present device detects a line voltage reversal and then disconnects the input line to the ADSL Modem. When the voltage returns to normal, then the device behaves normally by being closed, essentially acting as a pass through device and again connects the input lines to the output lines.

10 Claims, 3 Drawing Sheets

METHOD AND APPARATUS FOR AUTOMATED ASYMMETRIC DIGITAL SUBSCRIBER LINE LOOP TESTING

This application is a continuation of U.S. patent application Ser. No. 11/208,999 filed Aug. 22, 2005 now U.S. Pat. No. 7,620,155 (currently allowed) which is herein incorporated by reference in its entirety.

The present invention relates generally to communication networks and, more particularly, to a method and apparatus for automated Asymmetric Digital Subscriber Line (ADSL) loop testing in ADSL networks.

BACKGROUND OF THE INVENTION

In traditional ADSL loop testing operation, the customer must be home to help facilitate testing the line. Network technicians must step customers through a process of disconnecting equipment while the testing is being done, one piece of equipment at a time. In addition, testing is usually done at night so the communications lines are not disrupted. The customers find this testing process very inconvenient, time consuming and cumbersome.

Therefore, a need exists for a method and apparatus for automated ADSL loop testing.

SUMMARY OF THE INVENTION

In one embodiment, the present invention mechanizes the currently manual ADSL loop testing process. In one embodiment, an automated loop testing device is disclosed, where the loop testing device has a pair of terminals, e.g., RJ-11 jacks on both sides of the device. The jack on one side connects to an inside line which, in turn, connects to an ADSL modem. The other jack connects to an outside line which, in turn, connects to the central office of a network provider. This device detects a line voltage reversal and then disconnects the input line to the ADSL Modem. When the voltage returns to normal, then the device behaves normally by being closed, essentially acting as a pass through device and connects the input lines to the output lines. The present invention uses a specific methodology and the automated ADSL loop testing device to mechanize ADSL loop testing. The testing methodology and the automated ADSL loop testing device together allow the current testing process to be mechanized, making the ADSL loop testing process more convenient for both customers or subscribers and network provider technicians.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
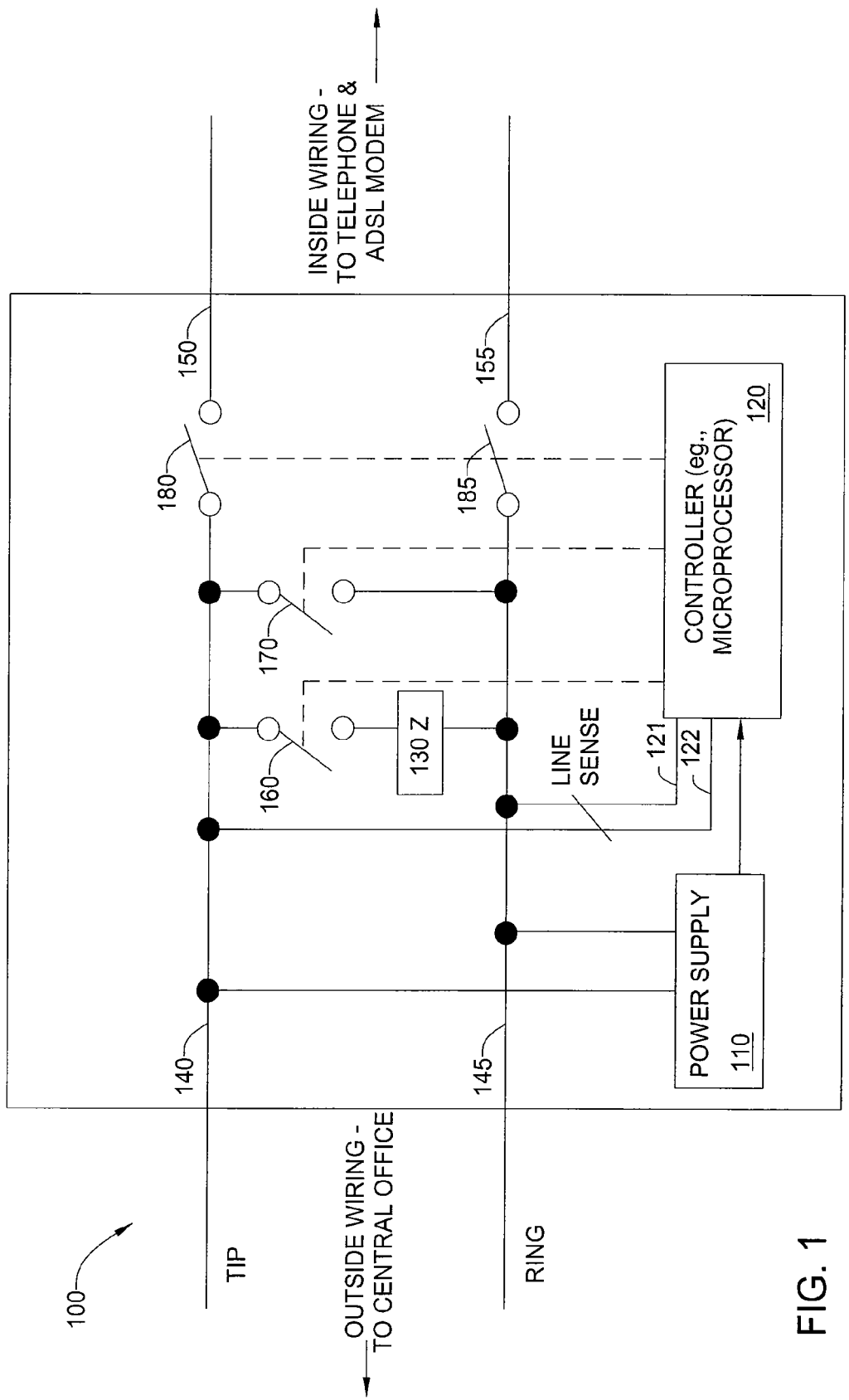
FIG. 1 illustrates a block diagram of an automated ADSL loop testing device of the present invention.

In one embodiment, the present invention is a device that automates and mechanizes the ADSL loop testing operation. In traditional ADSL testing, the customer must be home to help facilitate testing the ADSL line. Network technicians must step customers through a process of disconnecting equipment while the testing is being done, one piece of home networking equipment at a time. In addition, testing is usually done at night so the communications lines are not disrupted. The customers find this testing process very inconvenient, time consuming and cumbersome.

When customers first plug in their ADSL modem, the first signal that is sent by the ADSL modem is a low frequency signal to the Digital-Subscriber Loop Access Multiplexer (D-SLAM), e.g., every 30 seconds to announce its presence. Broadly defined, a D-SLAM is a network element in a network provider's central office which takes a number of ADSL subscriber lines on the access side and statistically multiplexes these lines onto a single higher capacity packet switched line on the network side of the network element. When the presence is sensed by the D-SLAM, the D-SLAM will send a response to the ADSL modem and the ADSL modem will stop sending the low frequency signal. If there is a communications problem between the ADSL modem and the D-SLAM and a response is not received by the ADSL modem, the ADSL modem will continue to send the low frequency signal every 30 seconds in order to get a response from the D-SLAM. While technicians try to take measurements, this signal noise dominates the line and destroys the ability to take any loop testing related measurements. The modem emits the high-power and low-frequency signal that renders test measurements useless.

The automated ADSL loop testing device of the present invention eliminates this problem by mechanizing the entire testing operation. The new device eliminates this low-frequency signal from the modem by disconnecting the line from the modem so that technicians can perform ADSL loop related test measurements, a testing process that lasts about two minutes. The automated ADSL loop testing device of the present invention can be shipped to the customer or subscriber and installed by the customer. The device is installed in line between the ADSL modem and the outside line connecting to the central office, and it measures voltage on the line. It allows technicians to apply the reverse voltage to begin testing.

Normally, the ADSL loop has a Direct Current (DC) voltage of −48 volts between the tip wire and the ring wire of the ADSL line. Note that each phone line between a residence and a central office, a pair of wiring known as the local loop, comprising the tip wire and the ring wire, is used to connect the residence and the central office. As soon as the device detects a reverse voltage condition, it disconnects the line from the ADSL modem and the device can facilitate loop testing without interferences from the ADSL modem. In one embodiment, a voltage reversal condition is a condition such that the voltage between the tip wire and the ring wire of the ADSL line has a DC voltage of +48 volts instead of −48 volts. The device of the present invention can also be used to provide other ADSL loop testing related feature, such as providing analog test signature and loopback test. For analog signature testing, a standard Resistance Inductance Capacitance (RLC) signature, such as a load impedance, that is a methodic group test can be placed at the end of an ADSL loop. For loopback testing, the tip wire and the ring wire of the ADSL line can be shorted to provide a loopback. Basically, technicians use the device to disconnect the line temporarily to complete testing of the ADSL line, after which the line is restored to service by reconnecting the line to the ADSL modem.

In one embodiment, the present invention is unique to ADSL. The device is not applicable to Symmetric Digital Subscriber Line (SDSL) or ISDN (Integrated Services Digital Network) Digital Subscriber Line (IDSL) because SDSL and IDSL loops do not carry any DC voltage.

FIG. 1 illustrates a block diagram of an automated ADSL loop testing device. Device 100 will be installed by the customer in line between the local loop, the phone line connecting to the central office, and the ADSL modem. Terminal 140 represents the tip wire terminal and terminal 145 represents the ring wire terminal connecting to the central office. In normal operations conditions, the tip wire is connected to the ground in the central office and the ring wire is connected to a −48 volt DC current source. When the automated ADSL loop testing device is installed, by default, switch 180 and switch 185 are in the closed position; therefore, the automated ADSL loop testing device provides straight through connectivity between terminal 140 and terminal 150, as well as between terminal 145 and terminal 155. Switch 160 and switch 170 are in the open positions by default.

Power supply 110 converts and stores DC line power to supply power to a controller 120, e.g., a microprocessor, to allow the automated testing to be performed by the technician. When the microprocessor senses a line reversal, e.g. DC voltage difference between terminal 121 (tip wire) and terminal 122 (ring wire) changes from −48 volts to +48 volts, it changes the position of switch 180 and switch 185 from closed to open to basically disconnect the ADSL modem from the ADSL loop. Microprocessor 120 may also perform:

a loopback on the line by setting switch 170 to the closed position; or placing an analog RLC signature impedance, Z, on the line by setting switch 160 to the closed position.

When switch 170 is in the closed position, the technician can perform continuity testing of the ADSL loop between the tip wire and the ring wire since the tip wire and the ring wire are essentially shorted by the automated ADSL loop testing device at the end of the ADSL loop. Then, microprocessor 120 sets switch 170 to the open position to disable the loopback and sets switch 160 to the closed position to place an analog RLC impedance signature at the end of the ADSL loop. The technician can proceed to perform the analog RLC impedance signature related testing when switch 160 is in the closed position. Then microprocessor 120 sets switch 160 to the open position again.

Once the aforementioned testing process has been performed and microprocessor senses the line voltage is again set to the normal condition, i.e. DC voltage difference between terminal 121 (tip wire) and terminal 122 (ring wire) changes from +48 volts back to −48 volts, switch 180 and switch 185 will be set again to the closed position to reconnect the ADSL loop with the ADSL modem.

Figure 2:
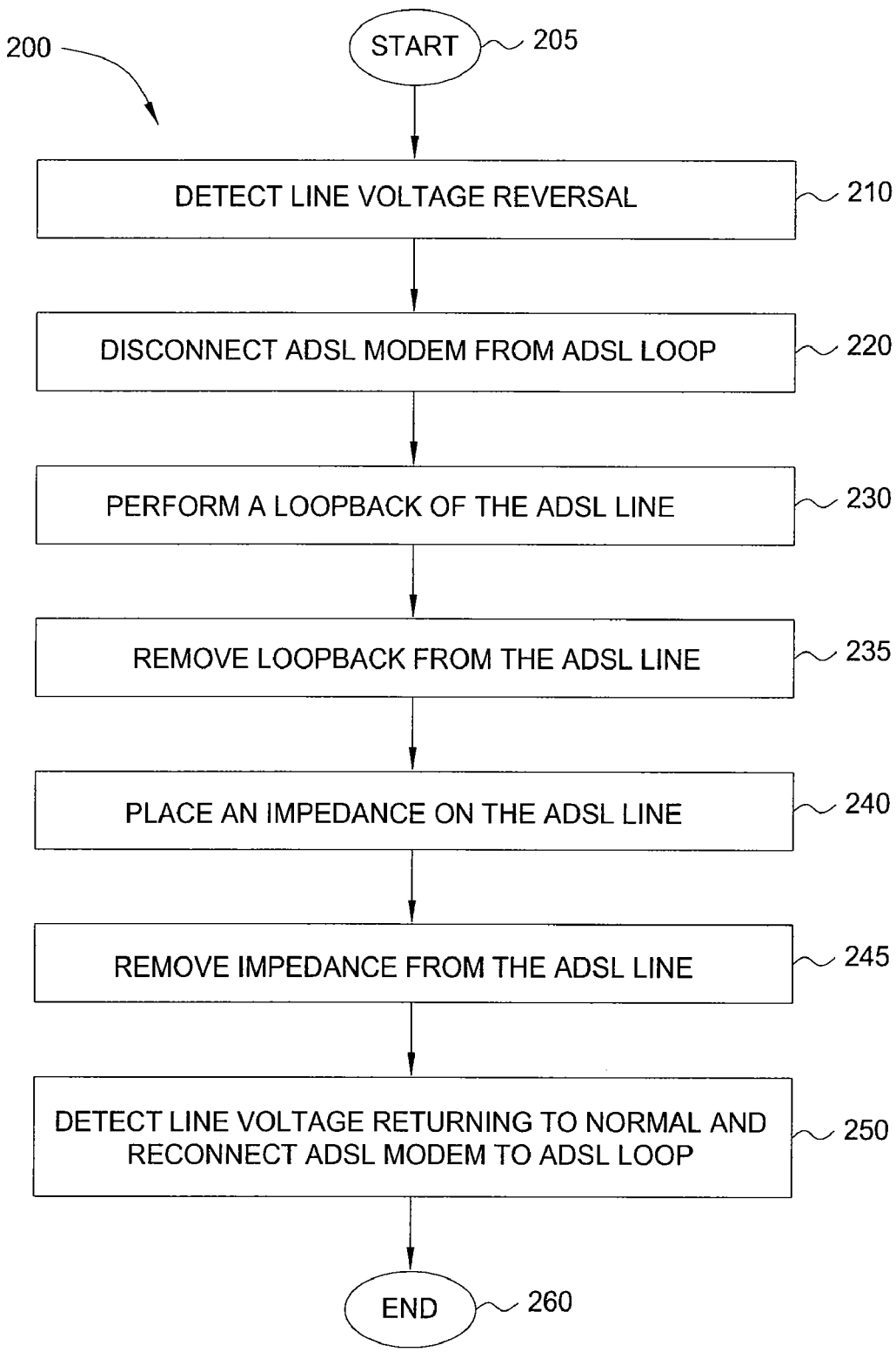
FIG. 2 illustrates a flowchart of a method to facilitate automated ADSL loop testing of the present invention.

FIG. 2 illustrates a flowchart of a method 200 to facilitate automated ADSL loop testing. Method 200 starts in step 205 and proceeds to step 210.

In step 210, the method 200 detects a line voltage reversal on the ADSL line. In step 220, the method disconnects the ADSL modem from the ADSL line. In step 230, the method performs a loopback toward the central office by shorting the tip wire and ring wire at the end of the ADSL loop. In step 235, the method disables the loopback by removing the short between the tip and the ring wire. In step 240, the method places a standard RLC analog impedance signature at the end of the ADSL line. In step 245, the method removes the analog signature from the ADSL loop. In step 250, the method detects the line voltage has returned to normal on the ADSL line and reconnects the ADSL modem to the ADSL line. The method ends in step 260.

It should be noted that the steps disclosed in FIG. 2 is illustrative. Namely, depending on the test that is being performed, the sequence and the number of the steps in FIG. 2 can be adjusted, or omitted accordingly. In other words, various steps of FIG. 2 can be perceived as optional.

Figure 3:
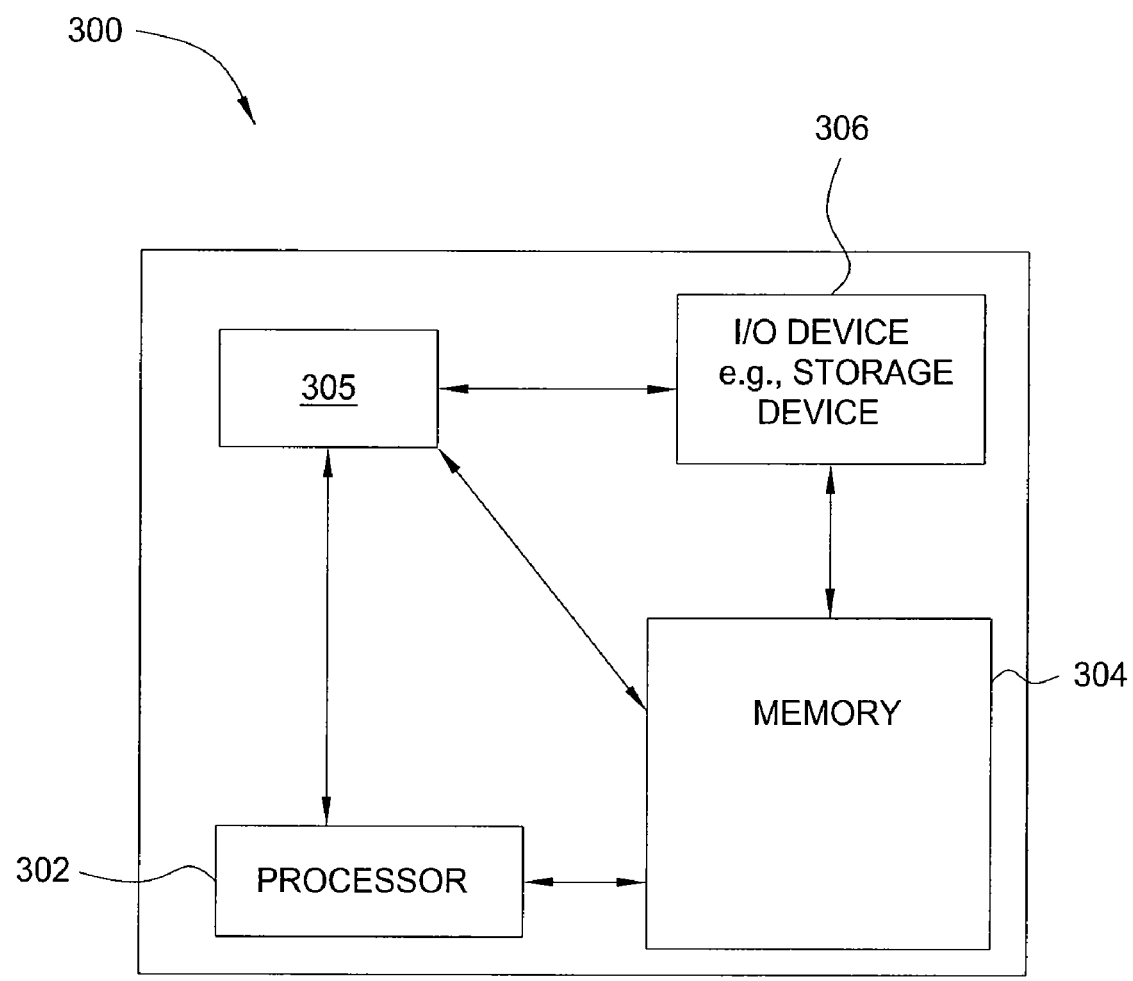
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), an automated ADSL loop testing module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present automated ADSL loop testing module or process 305 can be loaded into memory 304 and executed by processor 302 to implement the functions as discussed above. As such, the present automated ADSL loop testing process 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-readable storage medium having stored thereon a plurality of instructions, the plurality of instructions including instructions which, when executed by a processor, cause the processor to perform a method for enabling automated asymmetric digital subscriber line loop testing in a communication network, comprising:

providing a loop testing device, where the loop testing device is for being deployed in line between a local loop wire pair and an asymmetric digital subscriber line modem; and performing the automated asymmetric digital subscriber line loop testing by remotely triggering the loop testing device to cause the asymmetric digital subscriber line modem to be disconnected from the communication network, wherein the automated asymmetric digital subscriber line loop testing comprises:

closing a first switch via a controller within the loop testing device to initiate a loopback test;

opening the first switch via the controller within the loop testing device when the loopback test is completed;

closing a second switch via the controller within the loop testing device to initiate an impedance test; and opening the second switch via the controller within the loop testing device when the impedance test is completed.

2. The computer-readable storage medium of claim 1, wherein the communication network is an asymmetric digital subscriber line network.

3. The computer-readable storage medium of claim 1, wherein the local loop wire pair comprises a tip wire and a ring wire.

4. The computer-readable storage medium of claim 3, wherein the triggering comprises reversing a voltage between the tip wire and the ring wire.

5. The computer-readable storage medium of claim 4, wherein the voltage is a direct current voltage.

6. An apparatus for enabling automated asymmetric digital subscriber line loop testing in a communication network, where a loop testing device is deployed in line between a local loop wire pair and an asymmetric digital subscriber line modem, comprising:
    means for performing the automated asymmetric digital subscriber line loop testing by remotely triggering the loop testing device to cause the asymmetric digital subscriber line modem to be disconnected from the communication network, wherein the automated asymmetric digital subscriber line loop testing comprises:
        closing a first switch via a controller within the loop testing device to initiate a loopback test;
        opening the first switch via controller within the loop testing device when the loopback test is completed;
        closing a second switch via the controller within the loop testing device to initiate an impedance test; and
        opening the second switch via the controller within the loop testing device when the impedance test is completed.

7. The apparatus of claim 6, wherein the communication network is an asymmetric digital subscriber line network.

8. The apparatus of claim 6, wherein the local loop wire pair comprises a tip wire and a ring wire.

9. The apparatus of claim 8, wherein the triggering comprises reversing a voltage between the tip wire and the ring wire.

10. The apparatus of claim 9, wherein the voltage is a direct current voltage.

* * * * *